United States Patent [19]

Fossum et al.

[11] Patent Number: 4,926,674

[45] Date of Patent: May 22, 1990

[54] SELF-ZEROING PRESSURE SIGNAL GENERATOR

[75] Inventors: Steven C. Fossum, Hopkins; J. Gregory Sedivy, Prior Lake; Wayne K. Savick, Eden Prairie, all of Minn.

[73] Assignee: Innovex Inc., Hopkins, Minn.

[21] Appl. No.: 266,819

[22] Filed: Nov. 3, 1988

[51] Int. Cl.⁵ .............................................. G01L 27/00
[52] U.S. Cl. ..................................................... 73/4 R
[58] Field of Search ........................................... 73/4 R

[56] References Cited

U.S. PATENT DOCUMENTS

| | | | |
|---|---|---|---|
| 3,924,612 | 12/1975 | Dempster et al. | 73/4 R X |
| 4,146,875 | 3/1979 | Beatson et al. | 73/4 R X |
| 4,325,382 | 4/1982 | Miodownik | 73/4 R X |
| 4,537,065 | 8/1985 | Ootsuka et al. | 73/4 R X |
| 4,747,296 | 5/1988 | Feldon et al. | 73/4 R |

Primary Examiner—Tom Noland
Attorney, Agent, or Firm—Kinney & Lange

[57] ABSTRACT

A self-zeroing differential pressure signal generator. A strain gauge separates two areas of potentially differing fluid pressure and generates an electrical signal which varies as the fluid pressure difference varies. The strain gauge electrical signal is applied to the noninverting input terminal of noninverting amplifier, which develops a zeroed output signal. The noninverting amplifier includes a feedback loop which sums a feedback signal from the noninverting amplifier output with a zeroing compensation signal at the inverting input terminal of the amplifier. The zeroing compensation signal is developed by periodically eliminating the zeroing compensation signal and simultaneously exposing the strain gauge to a zero pressure difference. The output signal of the noninverting amplifier is compared to a reference output and a zeroing compensation signal is generated which, when summed with the feedback signal, brings the value of the output terminal to the value of the reference output.

11 Claims, 2 Drawing Sheets

SELF-ZEROING PRESSURE SIGNAL GENERATOR

The invention relates to self zeroing pressure signal generators.

BACKGROUND OF THE INVENTION

Pressure sensors have applications in air movement control, fluid level measurement, leak detection, medical instruments, industrial process controls and environmental controls, particularly including heating, ventilating and air conditioning. In many of these applications, pressure difference measurements generated by sensors are indirect indicators of fluid velocity or fluid volume rate of flow. Application of such sensors in systems characterized by small pressure differences has proven both difficult or excessively expensive. Certain types of inexpensive pressure sensors, such as silicon diaphragm sensors, have sufficient sensitivity to resolve pressure changes of less than 1/40 of a pound per square inch but give unreliable performance in the field because of drift problems associated with instantaneous temperature, temperature cycling, aging of the silicon crystal and other factors.

Instructive to the problems in low pressure systems are the difficulties encountered in using silicon diaphragm sensors in heating, ventilating and air conditioning systems. Pressure transducers can be used in the outlet of a conduit into a room to generate a signal indicating the quantity of air being admitted into a room through the conduit.

Silicon diaphragm pressure sensors have failed to provide predictable behavior at the pressure differentials present in forced air distribution systems despite having adequate sensitivity for the application. Silicon diaphragm sensors are manufactured using techniques common to the integrated circuit industry and are relatively cheap and plentiful. Accordingly, their application to air circulation systems is desirable. A thin, deformable silicon diaphragm separates two differing pressure regimes, in a differential sensor one side being at the local ambient pressure and the other side being at a slightly altered pressure. Incorporated in the deformable sensor are piezoresistive circuit elements, arranged in a wheatstone bridge, the resistivity of which is a function of the extent of deformation of the diaphragm.

Silicon diaphragm pressure sensors are typically designed to operate with full scale pressure of about 1.0 p.s.i. Application of the sensors to determining conduit air pressure typically entails operation over a small fraction of this range. Such operation exaggerates the drift problems exhibited by the sensors due to aging and thermal hysteresis. The sensors also exhibit considerable mechanical variability from sensor to sensor and are sensitive to changes in ambient temperature. All of these factors combine to produce considerable drift in the signal generated by the sensors.

SUMMARY OF THE INVENTION

The present invention provides periodic self zeroing of the output signal of a fluid pressure transducer. The fluid pressure transducer is disposed as a barrier between two pressure domains, such as exist between an air conduit and the local ambient atmosphere or between an air conduit and a vacuum where a measurement of absolute pressure is desired. The transducer develops a signal related to the pressure difference between the domains, or an absolute signal.

The transducer output signal is subjected to several stages of amplification, including a compensation stage. In the compensation stage the transducer output signal is compensated for the effects of aging, temperature and other factors affecting the operating characteristics of the transducer element. Compensation is provided by a noninverting operational amplifier, with the transducer element output signal being applied to the noninverting input and a compensated feedback signal being applied to the inverting input.

The feedback signal from the output of the noninverting amplifier is compensated by summing the feedback signal with a zeroing compensation signal at the inverting input of the noninverting amplifier. The zeroing compensation signal is a periodically updated signal, adjusted to bring the value of the output signal of the noninverting amplifier to a predetermined signal level when the transducer element is exposed to a condition of no net pressure differential. Periodic adjustment is enabled by a first clock signal generator.

The zeroing compensation signal is modified periodically during zeroing cycles. During each zeroing cycle, the pressure differential, or absolute pressure, applied to the transducer sensor element is eliminated and the output signal of the operational amplifier is compared by a comparator to a reference signal. The reference signal is preset to equal the desired value of the operational amplifier for the zero pressure or pressure differential situation. The output of the comparator indicates whether the output signal of the operational amplifier is too high or too low. The comparator output and a second clock signal, initiated by the first clock, are applied to a counter, which counts up or down depending upon the output value of the comparator. The count on the counter is converted to an analog signal by a digital to analog converter. Thus the count on the counter is linearly related to the level of the zero compensating signal. When the comparator indicates that the output of the operational amplifier is too high, the counter will increase its count by one with each cycle of the second clock to raise the level of the zeroing compensation signal and thereby reduce the level of the output of the operational amplifier. When the comparator indicates that the output signal of the operational amplifier is too low, each cycle of the second clock acts to decrement the count on the counter by one, gradually reducing the level of the zero compensating signal and raising the level of the output of the operational amplifier.

During adjustment of the zeroing compensation signal, the output of the noninverting amplifier is isolated by a sample and hold circuit which preserves the old output signal during adjustment of the zeroing compensation signal. No interruption of the circuits apparent output signal occurs.

DETAILED DESCRIPTION OF THE PREFERRED EMBODIMENTS

Figure 1:
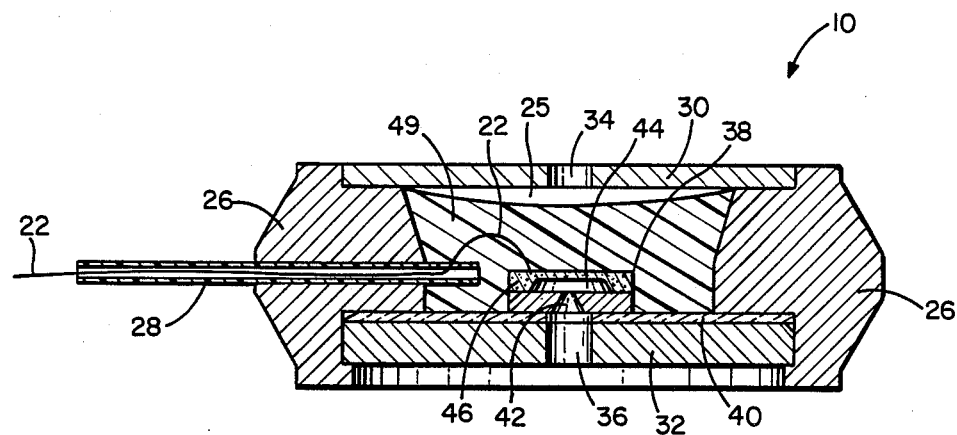
FIG. 1 is a cross sectional view of a pressure sensor element.
Figure 2:
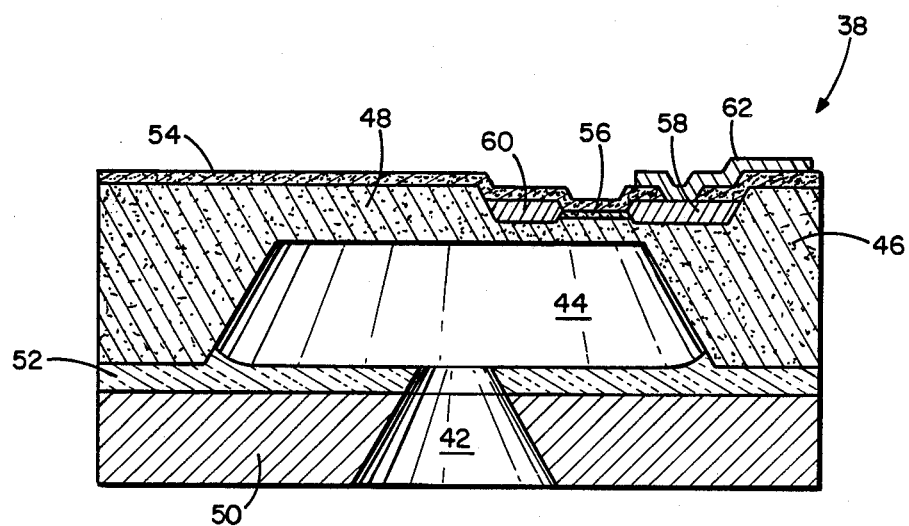
FIG. 2 is a detailed cross sectional view of a silicon diaphragm used in a differential pressure sensor.

FIGS. 1 and 2 illustrate an exemplary silicon diaphragm differential pressure transducer 10. Sensor 10 is exemplary of a class of sensors with which a signal generator in accordance with the teachings of the present invention can be constructed. Differential pressure transducer 10 is representative of the MPX series "Xducer" silicon pressure sensors available from the Motorola Inc., P.O. Box 20912, Phoenix, Ariz. 85036. "Xducer" is a trademark of Motorola.

Electrical leads 22 are carried through a protective thermoplastic case 26 into an interior plenum 25 of sensor element 10 in lead frames 28. Thermoplastic case 26 is a ring like structure with its opposite ends partially closed by metal covers 30 and 32. Metal covers 32 and 34 have openings 34 and 36, opening 34 leading to plenum 25. Silicon diaphragm assembly 38 is mounted over metal cover 32 around opening 36 and bonded thereto by a room temperature vulcanizing polymer bonding layer 40. Opening 36 provides communication between a pressure port 42 and a recess 44 in silicon wafer 46. Port 42 may also be closed where an absolute pressure sensor is used. Lead 22 is connected to silicon wafer 46 from lead frame 28. Plenum 25 is partially filled by a flexible filler material 40.

FIG. 2 illustrates silicon diaphragm assembly 38 in greater detail. Silicon wafer 46 is etched to provide recess 44 which defines a deformable silicon diaphragm 48. Wafer 46 is bonded to a silicon constraint wafer 50 by a glass frit seal 52. Wafer 46 is covered with an oxide passivization layer 54. Passivization layer 54 covers a diffused wheatstone strain gauge 56, which includes enhancement diffusion 58 and enhancement diffusion 60 providing the resistive strain gauge over a portion of diaphragm 48 most subject to deformation. An exemplary metallization layer 62 is shown in electrical contact with diffusion 58. Metallization layers are provided for making electrical contact between leads 22, 22', 24 and 24' (shown in FIG. 3) and resistive regions associated with strain gauge region 56.

Figure 3:
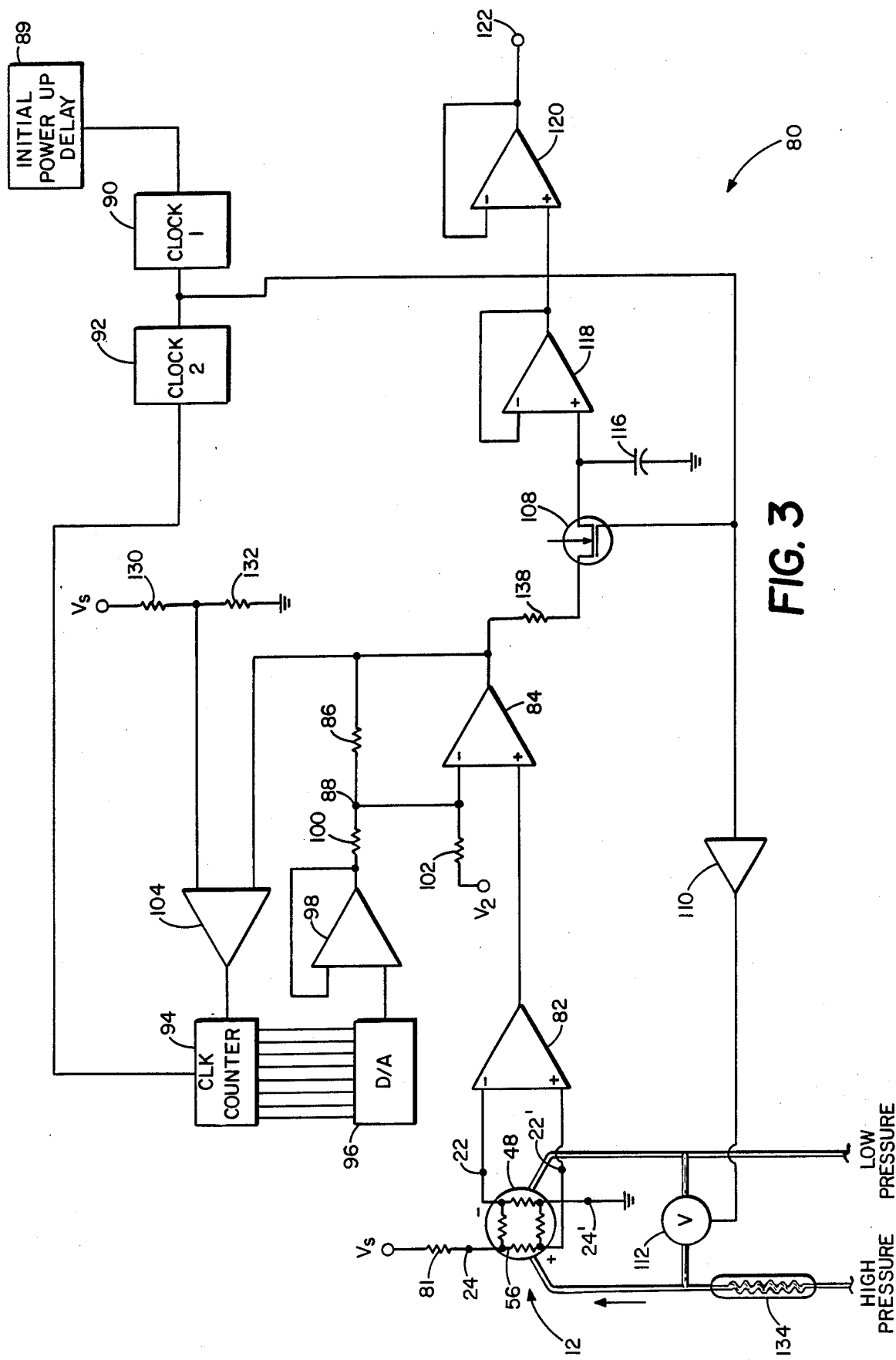
FIG. 3 is a block diagram of a compensated transducer signal generator.

FIG. 3 illustrates a sender 80, excluding power supply circuitry, which has been deleted for the sake of clarity. Sender 80 is connected by leads 22 and 22' to a bridge strain gauge 56 of differential pressure sensor 12. The voltage potential which appears across terminals 22 and 22' is connected to the inputs of differential amplifier 82, which in turn generates an output signal which varies as a function of the resistance of strain gauge 56. As indicated above, changes in the resistance of strain gauge 56 result primarily from deformation of diaphragm 48. Diaphragm 48 deforms primarily as a result of changes in the pressure difference across the diaphragm. However, other factors can contribute to resistance changes in strain gauge 56, including thermal hysteresis resulting from permanent changes in mechancial relationships among components of the sensor assembly, aging of the silicon crystal, ambient temperature. The factors do not vary, in the short run, as a result of air pressure changes across diaphragm 48. Rather, they contribute to drift of the output of the sensor.

Sender 80 operates to zero the signal from differential amplifier 82 around a predetermined level, compensating for drift effects. The output signal from differential amplifier 82 is applied to the noninverting input of an operational amplifier 84. Amplifier 84 generates a normalized electrical signal which varies as a function of differential pressure across diaphragm 48 and has a predetermined output level for a zero pressure or pressure differential. The signal on the output terminal of amplifier 84 is fed back to the inverting input terminal of the amplifier 84 by a resistor 86. At node 88, corresponding to the inverting input terminal, the feedback signal is adjusted by a zeroing compensation signal which corrects for drift in the output of strain gauge 56. The gain of amplifier 84 is set by the relative values of resistors 86 and 102. The output signal from amplifier 84 is coupled to output terminal 122 by resistor 138, transistor switch 108 and a pair of in series buffers 118 and 120.

The zeroing compensation signal is periodically adjusted upon generation of an enable signal by clock 90. In the preferred embodiment, adjustment occurs about every 10 seconds and upon initial powering up of sender 80. A clock pulse, or enable signal, is generated by clock 90. The enable signal is transmitted to an enable input of clock 92. The signal from clock 90 also causes the isolation of the output terminal of amplifier 84 by driving transistor switch 108 into nonconduction. The enable signal of clock 90 also actuates a valve 112 by drive amplifier 110 to eliminate any pressure differential across diaphragm 48, or in the case of an absolute pressure sensor to expose both sides of the sensor diaphragm to a substantial vacuum. During the adjustment cycle, the output of amplifier 82 is for a condition of zero pressure, or pressure differential. Initialization of the zeroing signal is prolonged during power up by initialization delay 89, which results in a one second enable pulse from clock 90. Otherwise, enable pulses are limited in duration to about 0.2 seconds.

Counter 94 is connected to clock 92 to accumulate a count of clock beats of clock 92. Digital to analog converter 96 is connected to counter 94 to provide the zeroing compensation signal which varies as a function of the accumulated count of counter 94. The zeroing compensation signal is transmitted by buffer 98 and resistor 100 to node 88 where it is summed with the feedback signal.

Appearance of a clock signal from clock 92 on counter 94 allows the accumulated count thereon to be changed. The accumulated count in counter 94 is converted to an analog zeroing compensation signal by digital to analog converter 96. Accordingly, the count on counter 94 is functionally related, and typically, linearly related to the level of the zeroing compensation signal. Increasing the count increases the zeroing compensation signal while decreasing the count decreases the zeroing compensation signal.

Comparator 104 has two inputs for comparing the output of noninverting amplifier 84 and a source of reference output Vo. The level of Vo is also the desired output signal level from amplifier 84 when no pressure difference exists across pressure sensor element 12. The enable signal from clock 90 occurs in conjunction with relieving any pressure difference across sensor 12. The output of noninverting amplifier 84 thereupon assumes its current output value for a zero pressure situation, as affected by various drift contributing affects. Comparator 104 generates a signal, causing counter 94 to count clock pulses from clock 92. The clock pulses are added to the accumulated total if the output signal of amplifier 84 is too high, and subtracted if the output signals from amplifier 84 are too low. The zeroing compensation signal is steadily adjusted until the output signal from amplifier 84 substantially equals Vo. At this point comparator 104 disables counter 94 locking the count at the level which caused the output to reach the level of VO. The zeroing compensation signal generated by digital-/analog converter 96 is buffered by buffer 98, and summed with fedback signal at node 88 through resistor 100.

During the period in which the compensation signal is being adjusted, transistor 108 is nonconducting and the signal out from noninverting amplifier 84 immediately preceding the adjustment phase is held by capacitor 116 so that control of air flow in the affected conduit is not interrupted. Buffers 118 and 120 isolate capacitor 116 from an output terminal 122 from which the preceding pressure differential signal is transmitted. Null valve 112 connects the high pressure side of diaphragm 48 to the low pressure side of the diaphragm. A flow restrictor in the high pressure feed line to the diaphragm has a flow restrictor 134 to assure that substantially all of the pressure drop in the line to the high pressure environment occurs above valve 112.

Knowledge of airflow in a low pressure system such as the conduits of a forced air system, allows local, automatic environmental control without contesting control of a central heating or cooling plant. In addition, a central environmental control can use the information to adjust heating and cooling rates based upon demand. Greater efficiency of the system through reduced waste results.

Although the present invention has been described with reference to the preferred embodiment, those skilled in the art will now recognize that changes may be made in form and detail without departing from the spirit and scope of the invention.

I claim:

1. A method of generating a zeroed pressure signal comprising the steps of:
    generating an electrical signal which varies as fluid pressure difference varies between two domains;
    applying the electrical signal to the noninverting input of an operational amplifier;
    applying a feedback signal from the output of the operational amplifier to the inverting input of the operational amplifier;
    periodically eliminating the pressure difference between the two areas;
    determining a compensation signal to be summed with the feedback signal at the inverting input of the operational amplifier to adjust the output signal of the operational amplifier to the value of a reference signal; and
    thereafter summing the determined compensation and feedback signals at the inverting terminal while pressure differences are allowed to occur between the domains.

2. A self-zeroing pressure signal generator for measuring the static pressure of a fluid, the signal generator comprising:
    a pressure transducer generating a fluid pressure level signal;
    means for establishing a known pressure difference on the pressure transducer;
    means for generating a zeroing compensation signal;
    a comparator comparing the fluid pressure signal to the zeroing compensation signal and generating a compensated fluid pressure signal thereby; and
    means for initiating calibration of the compensated fluid pressure signal by actuating the means for establishing the known pressure difference and by adjusting the output of the means for generating a zeroing compensation signal to provide a compensated fluid pressure level signal of a predetermined value.

3. The self-zeroing pressure signal generator as set forth in claim 2 wherein the means for generating the zeroing compensation signal further includes:
    a counter for counting the clock pulses from the second clock;
    a polarity comparator for comparing the compensated pressure level signal with a reference level and for causing the counter to subtract clock pulses if the compensated pressure level signal is too high and to add clock pulses if the compensated pressure level signal is too low; and
    a digital to analog converter for converting the output of the counter to an analog signal for adjusting the gain of the comparator.

4. The self-zeroing pressure signal generator as set forth in claim 3 and further comprising a sample and hold circuit including a transistor switch responsive to initiation of adjustment of the zeroing compensation signal for isolating the output terminal of the comparator, and a capacitor for holding the signal level of the compensated pressure signal on a signal generator output terminal.

5. The self-zeroing pressure signal generator as set forth in claim 4 wherein the transducer means further includes a silicon diaphragm strain gauge.

6. The self-zeroing pressure signal generator of claim 2 wherein the means for initiating calibration further comprise:
    a first clock generating a first clock signal; and
    a second clock actuated periodically by the first clock signal and generating a second clock signal of higher frequency than the frequency of the first clock.

7. A self-calibrating pressure differential sender comprising:
    a pressure transducer dividing two pressure domains and generating an uncompensated pressure difference signal related to the pressure difference between the domains;
    a plurality of amplifier stages for amplifying the output of the pressure transducer;
    the plurality of amplifier stages including a compensation amplifier stage for converting the uncompensated pressure difference signal into a compensated pressure difference signal;
    a compensation offset circuit generating an output signal for calibrating the compensation amplifier stage;
    a valving system for connecting the two pressure domains; and
    a clock for initiating periodic adjustment of the output signal of the compensation offset circuit including actuation of the valving system to establish a pressure equilibrium between the two domains.

8. The self-calibrating pressure differential sender of claim 7 wherein the compensation offset circuit further includes:
    a source of a reference signal;
    a comparator for comparing the output signal from the compensation offset stage with the reference signal and generating an add signal when the output signal is relatively positive and a subtract signal when the output signal is relatively negative; and means responsive to the comparator and the clock for gradually adjusting a zeroing compensation signal which adjusts the output signal level of the compensation offset amplifier to the value of the reference signal.

9. The self-calibrating pressure differential sender as set forth in claim 8 wherein the clock further includes:
   a first clock for generating an adjustment initiation signal; and
   a second clock which generates a clock signal in response to the adjustment initiation signal.

10. The self-calibrating pressure differential sender as set forth in claim 9 wherein the compensation offset circuit further includes:
   a counter which increments its count in response to the clock signal when the comparator indicates that the output signal of the compensation amplifier stage is positive with respect to the reference signal and which decrements its count when the comparator indicates that the output signal of the compensation amplifier circuit is negative with respect to the reference signal; and
   a digital to analog converter for converting the accumulated count of the counter to a zeroing compensation signal.

11. The self-calibrating pressure differential sender of claim 10 and further comprising a sample and hold circuit including a transistor switch responsive to the initiation signal for isolating the output terminal of the compensation amplifier stage and a capacitor for preserving the output signal of the compensation amplifier stage immediately preceding the initiation signal.

* * * * *